(12) United States Patent
Bartoli et al.

(10) Patent No.: US 10,173,362 B2
(45) Date of Patent: Jan. 8, 2019

(54) FORMING APPARATUS AND METHOD AND OBJECT THUS MADE

(71) Applicant: Illycaffe' S.p.A., Trieste (IT)

(72) Inventors: Andrea Bartoli, Reggio Emilia (IT); Flavio Traldi, San Prospero (IT); Luca Mastropasqua, Trieste (IT)

(73) Assignee: Illycaffe' S.p.A. (IT)

( * ) Notice: Subject to any disclaimer, the term of this patent is extended or adjusted under 35 U.S.C. 154(b) by 815 days.

(21) Appl. No.: 14/399,353

(22) PCT Filed: May 7, 2013

(86) PCT No.: PCT/IB2013/053648
§ 371 (c)(1),
(2) Date: Nov. 6, 2014

(87) PCT Pub. No.: WO2013/168083
PCT Pub. Date: Nov. 14, 2013

(65) Prior Publication Data
US 2015/0140251 A1 May 21, 2015

(30) Foreign Application Priority Data
May 9, 2012 (IT) .............................. MO2012A0122

(51) Int. Cl.
*B29C 51/26* (2006.01)
*B29C 51/02* (2006.01)
(Continued)

(52) U.S. Cl.
CPC ............ *B29C 51/265* (2013.01); *B29C 51/02* (2013.01); *B29C 51/087* (2013.01); *B29C 51/262* (2013.01); *B29C 51/428* (2013.01); *B29C 43/361* (2013.01); *B29C 51/04* (2013.01); *B29C 51/424* (2013.01); *B29C 2791/007* (2013.01); *B29C 2793/0054* (2013.01); *B29C 2793/0081* (2013.01); *B29K 2023/12* (2013.01); *B29K 2105/256* (2013.01);
(Continued)

(58) Field of Classification Search
CPC ..................................................... B29C 51/265
See application file for complete search history.

(56) References Cited

U.S. PATENT DOCUMENTS

| 3,236,373 | A | 2/1966 | Lux |
| 3,611,500 | A | 10/1971 | Carrigan et al. |
| 2008/0257165 | A1 | 10/2008 | Blozicco et al. |

FOREIGN PATENT DOCUMENTS

| AU | 2008316468 B2 | 4/2009 |
| DE | 19737503 A1 | 3/1999 |

(Continued)

*Primary Examiner* — Larry W Thrower
(74) *Attorney, Agent, or Firm* — Laubscher & Laubscher, P.C.

(57) ABSTRACT

A method for making objects by forming a thermoformable sheet material includes forming the objects by interaction of a die assembly and a forming assembly. The method further includes, compressing and crushing a first portion of the sheet material by a crushing punch device before forming the objects and maintaining the first portion crushed during the forming operation to reduce the thickness thereof and to orientate chains of molecules that compose a structure of the sheet material at the first portion, in order to weaken the structure and the first portion. The first portion is thus easily perforable, tearable and breakable.

5 Claims, 7 Drawing Sheets

(51) Int. Cl.
  *B29C 51/08*     (2006.01)
  *B29C 51/42*     (2006.01)
  *B29L 31/56*         (2006.01)
  *B29C 43/36*         (2006.01)
  *B29C 51/04*         (2006.01)
  *B29K 23/00*         (2006.01)
  *B29K 105/00*        (2006.01)
  *B29L 31/00*         (2006.01)

(52) U.S. Cl.
  CPC . *B29K 2995/0081* (2013.01); *B29L 2031/565* (2013.01); *B29L 2031/712* (2013.01); *Y10T 428/15* (2015.01)

(56) References Cited

FOREIGN PATENT DOCUMENTS

| | | |
|---|---|---|
| EP | 1066950 A1 | 10/2001 |
| FR | 1407394 | 7/1965 |
| GB | 1088286 | 10/1967 |
| GB | 1136613 | 12/1968 |
| JP | 2003159743 A | 6/2003 |
| JP | 2008279251 A | 11/2008 |
| JP | 2009544439 A | 12/2009 |
| JP | 2011500386 A | 1/2011 |
| WO | 2007101868 A2 | 9/2007 |
| WO | 2008011913 A1 | 1/2008 |

FORMING APPARATUS AND METHOD AND OBJECT THUS MADE

This application is a § 371 National Stage entry of PCT International Application No. PCT/IB2013/053648 filed May 7, 2013. PCT/IB2013/053648 claims priority to IT Application No. MO2012A000122, filed May 9, 2012. The entire contents of these application are incorporated herein by reference.

The invention relates to forming apparatuses and methods, in particular it relates to an apparatus and a method for making objects by compression forming of a thermoformable sheet material. The invention further relates to an object, in particular a cover for a container, obtained by said apparatus and method.

A known forming apparatus, associable with a thermoforming machine, typically comprises a mould consisting of a die and a punch. The die is provided with a least one cavity configured for receiving, in a forming step, the sheet material and is shaped with the external shape of the object to be made.

The punch is in turn shaped in such a manner as to compress the sheet inside the cavity and, in cooperation with the cavity, to make the object. In particular, in the forming step, the punch is movable towards the die and engages with the cavity so as to deform the sheet material. The latter is previously heated to a softening temperature that permits the plastic deformation thereof, increasing the plasticity and deformability thereof.

The die is provided with conduits within which a fluid flows that is arranged for cooling the sheet material once it is deformed inside the cavity so as to bestow suitable mechanical features on the object made.

The forming apparatus can comprise a containing element, so-called bell, which encloses the punch and bounds a closed work zone. More precisely, the bell abuts and compresses the sheet material against the die, defining the work zone that is substantially isolated from the external environment and into which compressed and heated air can be introduced that assists the punch to make the sheet material adhere better to the walls of the cavity.

The forming apparatus is typically associated with a forming machine including a plurality of operating stations through which the thermoformable sheet material is unwound from a reel and advanced by a suitable advancement assembly.

The operating stations comprise, for example, upstream and downstream of the forming station provided with the forming apparatus, respectively a preheating station, in which the sheet material is heated to a preset softening temperature, and a cooling station, in which the formed object is cooled and thermally stabilised to ensure suitable resistance to mechanical stress.

The objects made with the known thermoforming apparatuses disclosed above are easier to make and cheaper than objects obtained by extrusion or injection moulding processes.

The thickness of the sheet material is chosen in such a manner as to ensure suitable features of resistance and toughness for the object made. Nevertheless, owing to the thicknesses generally used and the mechanical features of the sheet material once it has been thermoformed and cooled, some operations on the aforesaid material are difficult to perform. In particular, it is generally difficult to make perforations or incisions, unless sheets of material with a very reduced thickness are used, which thickness is insufficient for making stiff, resistant and tough objects.

In the field of capsules or containers for preparing beverages in automatic beverage machines, it is known to easily perforate a capsule containing a (percolable, soluble, infusion) product to enable pressurised liquid, typically water, to be mixed with the product and the obtained beverage to exit. In particular, the capsules have to be perforable by suitable devices of the beverage machine and/or by cooperation between the capsule and such suitable devices.

The capsules typically comprise a container in the shape of a cup closed above by a cover.

The capsules and the covers made by a thermoforming process are not, however, generally perforable, as the thicknesses of the sheet material that would permit boring thereof would be insufficient to ensure the stability and the resistance of the capsule during injecting of the pressurised fluid at high temperatures.

For this purpose, capsules are used that are closed by a sheet of aluminium or plastic film that are easily perforable and/or are provided with a hole on the bottom wall (the bottom being made during thermoforming), which hole is also closed by a film of aluminium or of plastics.

Alternatively, capsules and covers have to be used that are produced by injection moulding processes that enable portions of the object to be made that have a reduced thickness and mechanical features that are such as to enable a perforation or incision to be made on such objects. Nevertheless, such objects are particularly costly because of the process and the plastics to be used for the injection moulding.

One object of the present invention is to improve known methods and apparatuses to make objects forming a thermoformable sheet material.

Another object is to make a method and an apparatus that enable objects to be formed that have high mechanical resistance and robustness features and is at the same time provided with easily perforable weakened portions.

A still other object is to make a method and an apparatus that enable objects to be formed that are provided with weakened portions having precise and accurate thickness values.

A still further object is to obtain a forming apparatus that is constructionally simple.

Still another object is to obtain a forming method and an apparatus that enable the production costs of the objects to be lowered.

The invention can be better understood and implemented with reference to the attached drawings that illustrate some embodiments thereof by way of non-limiting examples, in which.

Figure 1:
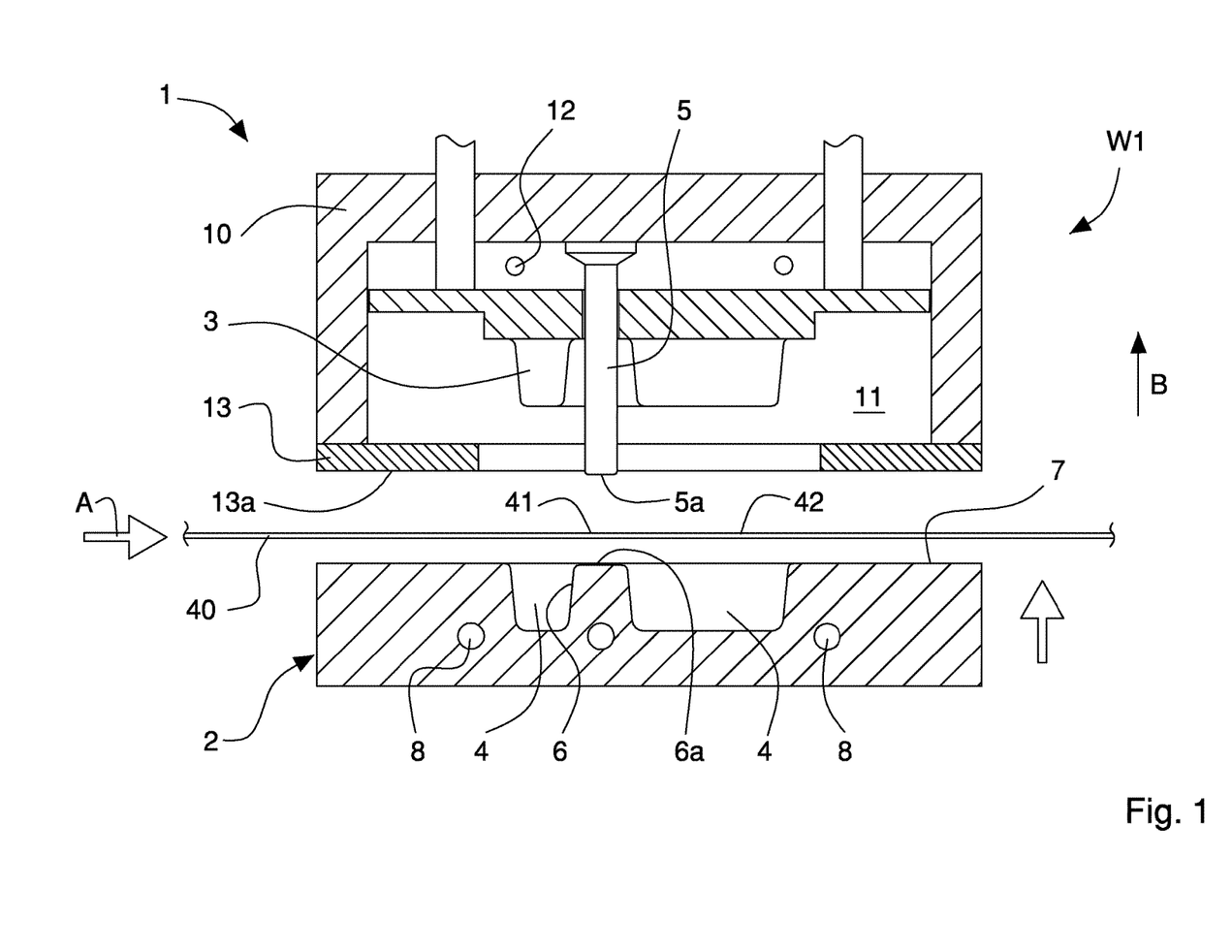
FIG. 1 is a schematic cross section of a forming apparatus according to the invention in a first operating configuration.
Figure 2:
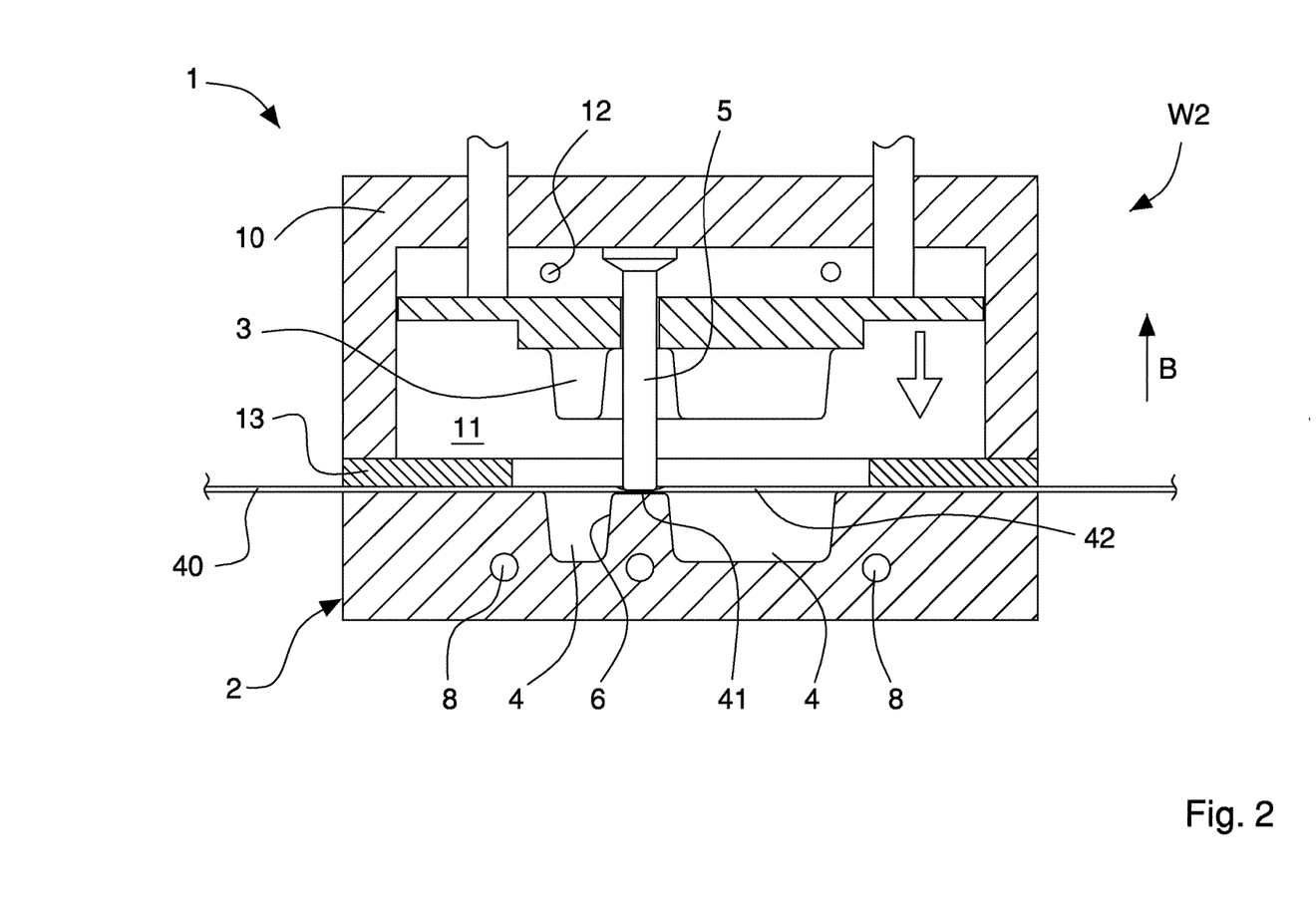
FIG. 2 is a schematic cross section of the apparatus in FIG. 1 in a second operating configuration.
Figure 3:
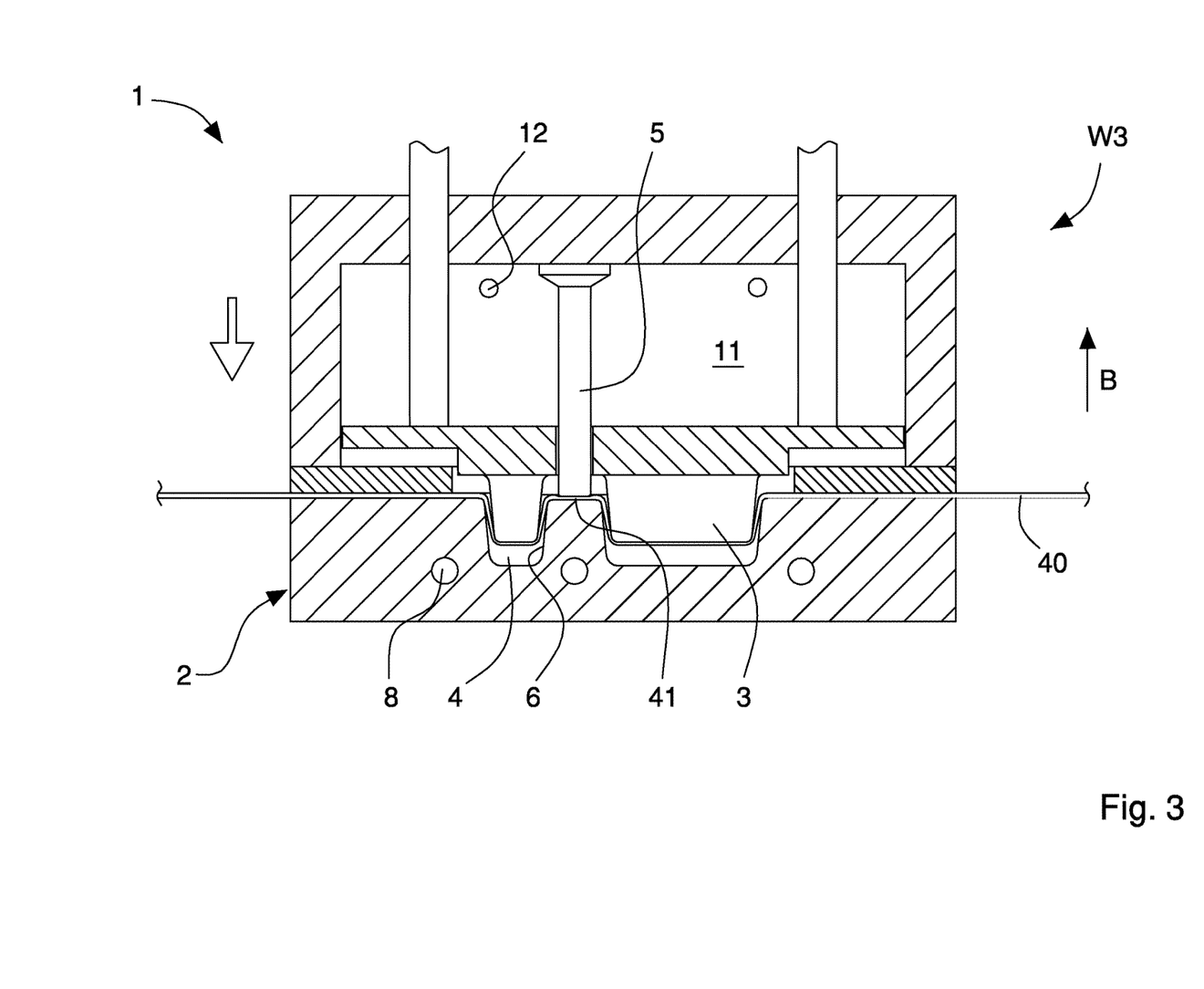
FIG. 3 is a schematic cross section of the apparatus in FIG. 1 in a third operating configuration.
Figure 4:
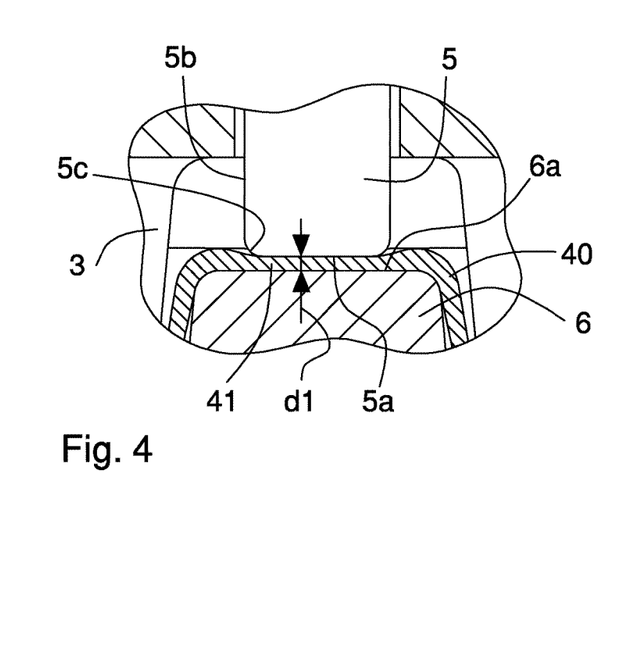
FIG. 4 is a partial enlarged view of a detail of the apparatus in FIG. 3.

With reference to FIGS. 1 to 3 a forming apparatus 1 is shown for compression-forming an object 50, shown in FIG. 4, from a thermoformable sheet material 40.

Figure 7:
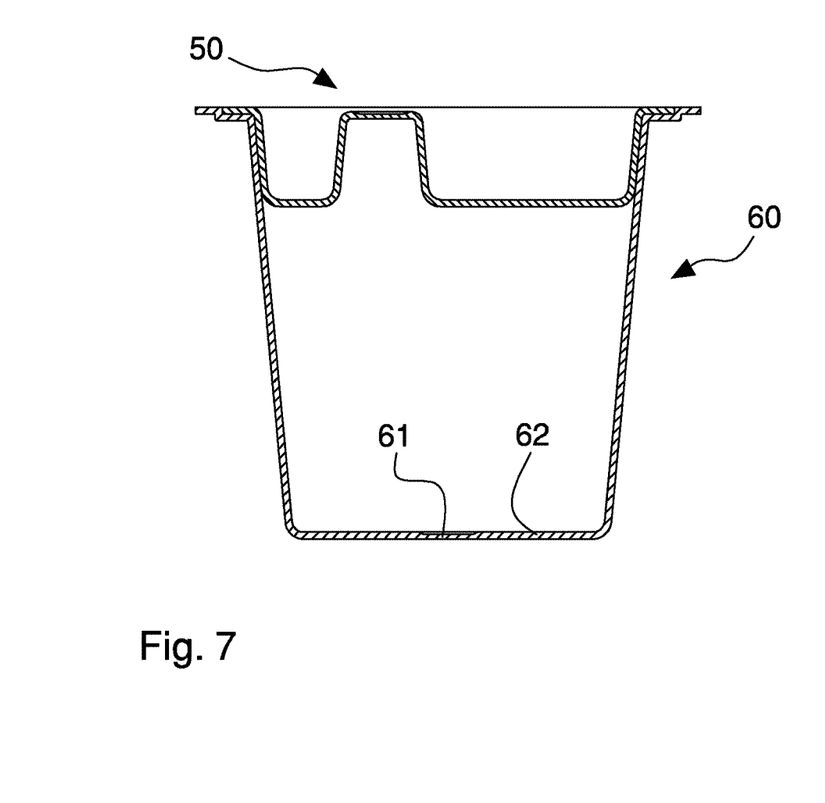
FIG. 7 is a cross section of the cover in FIG. 5 associated with a container that is also makable with a version of the forming apparatus of the invention.

The object 50 comprises, for example, a cover that is usable for closing a container, as illustrated in FIG. 7.

The apparatus 1 can be associated with a forming machine, which is not shown, comprising a plurality of work stations, including a forming station with which the apparatus 1 and other stations preceding and following the forming station are associated. For example, upstream of the forming station a heating station of the sheet material 40 can be provided to bring the sheet material 40 to high temperatures that are such as to enable the sheet material 40 to be softened and plastically deformed in the subsequent forming station. The sheet material 40 is heated to a temperature comprised between 100° C. and 180° C., in particular between 140° C. and 165° C.

The apparatus 1 of the invention includes a die assembly 2 provided with a cavity portion 4 and a forming assembly 3 cooperating with the cavity portion 4 to form the objects 50. In the embodiment shown in the figures the forming assembly includes a punch portion 3.

The die assembly includes a die 2 that is movable along a movement direction B that is substantially orthogonal to the sheet material 40 and to an advancement direction A thereof inside the forming apparatus.

The cavity portion includes at least one cavity 4 having a shape corresponding to the object 50 to be formed. The punch portion includes at least one shaped punch 3 having a shape that is complementary to the cavity 4 in order to shape the object 50 by compression.

The apparatus 1 is further provided with a crushing punch portion 5 including at least one crushing punch interacting and cooperating with the die 2 for compressing a first portion 41 of the sheet material 40 before the forming step in order to reduce and weaken the thickness thereof, and modify a structure of the material thereof, as explained in greater detail below. For this purpose, the die 2 includes an abutting portion 6 that is suitable for supporting the first portion 41 of sheet material and cooperating with the crushing punch 5 to compress the latter. The abutting portion 6 includes a ridge provided inside the cavity 4.

The crushing punch 5 is maintained cooled, i.e. maintained at a temperature, in particular comprised between 15° C. and 40° C., such as to locally cool the first portion 41 and to obtain a structure of said sheet material 40 substantially in amorphous phase at the first portion 41. It is noted that the temperature of the crushing punch 5 is considerably lower than the temperature of the sheet material 40 that is heated to a temperature between 100° C. and 180° C., particularly between 140° C. and 165° C.

The crushing punch 5 may be cooled by a corresponding cooling device, not shown in the figures, including internal conduits for the passage of a cooling fluid or including materials with high thermal conductivity.

The crushing punch 5 includes a substantially circular end wall 5a that presses the first portion 41 of sheet material 40 against a corresponding abutting wall 6a of the abutting portion 6 that also has a circular shape. The end wall 5a is connected to a side cylindrical wall 5b by a connecting portion 5c having a round shape.

The surface roughness of the end wall 5a of the crushing punch 5 is lower than 0.4 μm, in particular lower than 0.2 μm.

The die 2 is provided with conduits 8 for the passage of a cooling liquid suitable for cooling external surfaces of the cavity 4 and of the abutting portion 6. In this manner, the material 40 adhering to the external surfaces during forming can be quickly cooled to acquire the required mechanical features.

The cooled external surfaces of the abutting portion 6 cooperate with the crushing punch 5 to locally cool the first portion 41 and to make the amorphous phase structure of the sheet material.

The forming assembly 3 operates on a second portion 42 of the sheet material 40 contiguous to the first portion 41. In particular, with reference to the embodiment shown in the figures, the second portion 42 surrounds the first portion 41 and substantially forms the body of the object 50.

The apparatus further includes a containing device 10 that includes a bell shaped containing element arranged for pressing the sheet material 40 against a supporting wall 7 of the die 2 and retaining the sheet material 40 before forming. The cavity 4 opens on the supporting wall 7.

The containing element 10 defines a work volume 11 containing the punch 3 and the crushing punch 5. The forming assembly further includes a delivering device 12 that delivers a pressurised fluid inside the work volume 11 to make the sheet material 40 adherent to the walls of the cavity 4.

The crushing punch 5 is fixed to the containing element 10 to abut the first portion 41 of sheet material 40 and press the first portion 41 against the abutting portion 6 when the die 2 is raised along the movement direction B and compresses the sheet material 40 against a compression plate 13 of the containing element 10.

In particular, the crushing punch 5 is adjustably fixed to the containing element 10 to vary a thickness or amount of crushing d1 of the first portion 41 (FIG. 4). In other words, it is possible to vary the position of the end wall 5a of the crushing punch 5 with respect to an abutting face 13a of the compression plate 13, thus determining a lower or greater crushing of the first portion 41 against the abutting wall 6a of the abutting portion 6.

In one embodiment of the apparatus that is not illustrated in the figures, the crushing punch 5 is movably mounted with respect to the containing element 10 independently of the punch 3. In this embodiment, the punch 3 and the crushing punch 5 are driven by respective and independent actuating devices that are of known type and is are not illustrated in the figures.

The operation of the forming apparatus 1 and the corresponding forming method or process provide in a first step the advancement along the advancement direction A of the sheet material 40, which has been previously heated to a temperature that is sufficient to soften the sheet material 40, inside the forming apparatus 1. The latter is arranged in a first operating configuration W1 in which the die 2, the containing element 10 and the punches 3, 5 are spaced away from the sheet material 40 to enable sheet material to slide.

In a second step, the die 2 is moved along the movement direction B such that the sheet material 40 is compressed by the supporting wall 7 against the compression plate 13 of the containing element 10 and the first portion 41 of sheet material 40 is compressed and crushed between the abutting portion 6 and the crushing punch 5 in a second operating configuration W2 of the apparatus 1.

In this second operating configuration W2, the relative position between the crushing punch 5 and the abutting portion 6 and the force exerted by the latter on the first portion 41 of sheet material 40 is such as to reduce the thickness thereof to a desired value d1.

The compression and crushing effect exerted by the crushing punch 5 and by the abutting portion 6 not only reduces of the local thickness of the material, but also radially orients the fibres or chains of molecules that form the structure of the thermoformable plastics. This orientation is due to both the pressure exerted by the crushing punch 5 and to the circular shape of the end wall 5a of the latter.

The proper orientation of the fibres of plastics is also promoted by the reduced surface roughness of the end wall 5a of the crushing punch 5 (roughness lower than 0.4 μm, in particular lower than 0.2 μm). This surface finishing also prevents, during compression and crushing, surface layers of the sheet material to be damaged or wrecked (for example with micro-cracking or micro-incisions), this determining an alteration of the mechanical characteristics of the material at the first portion 41.

Since the crushing punch 5 is maintained at a temperature comprised between 15° C. and 40° C. and the abutting portion 6 as well as the cavity 4 are cooled by the cooling liquid that flows in the conduits 8 of the die 2 the abutting portion 6 is also cooled while the first portion 41 of the sheet material is compressed and crushed between the crushing punch 5.

As known, the plastic polymer materials usually used in thermoforming (PP, PVC, PE, PET, PA, PS, PLA, starch-based biodegradable plastics, bio-based polymer materials such as, for example, PE and/or PP and/or PA obtained from renewable resources, biodegradable resources obtained from a microbial source such as, for example, PHA and the like) are formed of long chains of molecules the orientation of which can be modified by plastic processing such as lamination, extrusion and the like. The structure of these materials can be further modified, after heating to a temperature in which the vitreous transition of the material occurs (so-called softening temperatures), from the cooling speed. In the case of polypropylene (PP), for example, at high cooling speeds, at the end of the forming process the material has a structure that is substantially in an amorphous step with limited portions in the crystalline step. The amorphous phase gives the material plastic elasticity and resistance.

At low cooling speeds, at the end of the forming process the material has a structure that is mostly in crystalline phase and to a more limited extent in an amorphous phase. The crystalline phase in this case gives lesser elasticity and greater fragility.

The aforesaid sheet plastics can be single-layered or multilayered, according to the specific applications.

Experimental tests conducted by the applicant have shown that the radial orientation obtained from the compression exerted by the crushing punch and the rapid cooling guaranteed by the crushing punch 5 and/or by the abutting portion 6 enable a first portion 41 of sheet material 40 to be obtained that has a structure that is substantially weakened and can thus be easily torn, perforated or pierced, for example by a tip of conical shape. The rapid cooling, in particular, enables formation of an elastic and durable structure for easy perforation without the undesired detachment of particles, fragments, splinters of material.

Figure 8:
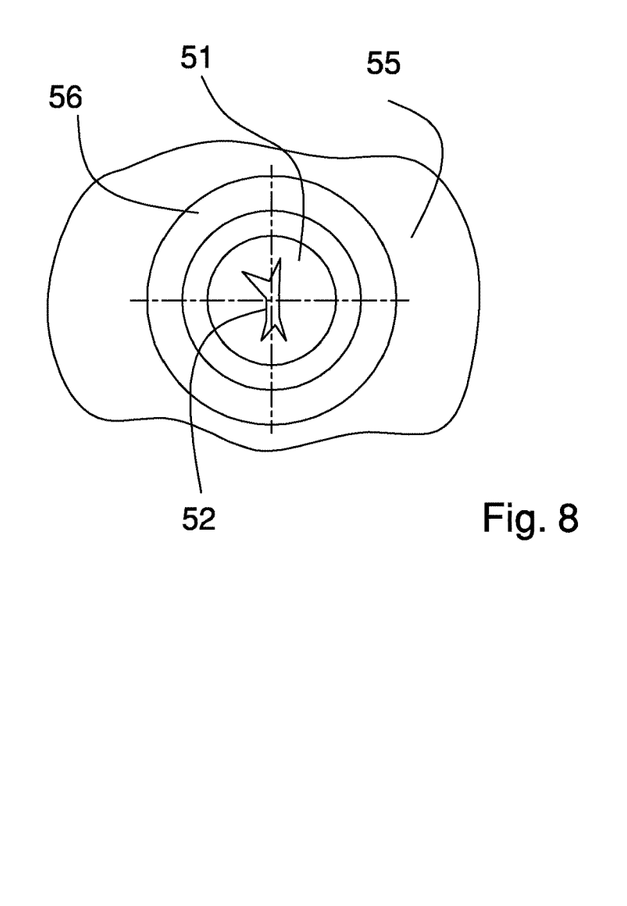
FIG. 8 is a partial and enlarged view of the object in FIG. 5 that illustrates a perforation made on a portion thereof with a tip of conical shape.

FIG. 8 illustrates the effects of this perforation on an object 50 obtained by thermoforming a sheet material of polypropylene having a 1.2 mm thickness and in which a weakened portion 51 of the object 50 formed by the first portion 41 of sheet material 40 compressed by the crushing punch 5, has been reduced in thickness to a value d1 equal to 0.3-0.75 mm, in particular equal to 0.3-0.4 mm. As is noted, the fracture 52 generated by a conical tip has a substantially radial pattern, i.e. according to the local orientation of the molecular chains of the structure of the material.

The effect of the compression is clear, considering that the sheet material that has the same thickness as that of the first portion 41 (i.e. 0.3-0.75 mm) and is not subject to local compression by the crushing punch 5 is very difficult to perforate and requires the use of higher compression forces.

It is appropriate to point out that owing to the shape of the crushing punch 5—and in particular of the end wall 5a and of the connecting portion 5c of round shape—crushing the first portion 41 does not damage or tear an intermediate barrier layer that may be provided in the sheet material 40 of multilayered type. The intermediate barrier layer is of known type, for example EVOH. In this manner, the integrity of the material and in particular of the barrier layer is guaranteed also at the first portion 41.

In a third step of the forming process (forming step), in which the forming apparatus is in a third operating configuration W3, the punch 3 of the forming assembly is moved along the movement direction B towards the die 2 to progressively compress the sheet material 40 inside the cavity 4 and form the object 50, while the crushing punch 5 keeps the first portion 41 compressed and crushed against the abutting portion 6. In particular, the punch 3 operates on the second portion 42 of the material sheet 40 that is contiguous to and surrounds the first portion 41.

At the end of compression, or before the punch 3 is lowered completely, hot pressurised air can be delivered inside the work volume 11 to facilitate adhesion of the sheet material 40 to the walls of the cavity 4.

It should be observed that compressing and crushing the first portion 41 of the material sheet 40 before the forming step (third step) of the object 50 and maintaining this first portion 41 compressed and crushed during this forming step, helps in obtaining the desired thickness d1 requested in said first portion 41 with high precision and accuracy.

Experimental texts have shown that objects 50 having first portions 41 substantially with the same thicknesses d1 can be made thanks to the apparatus and the method of the invention.

Figure 9:
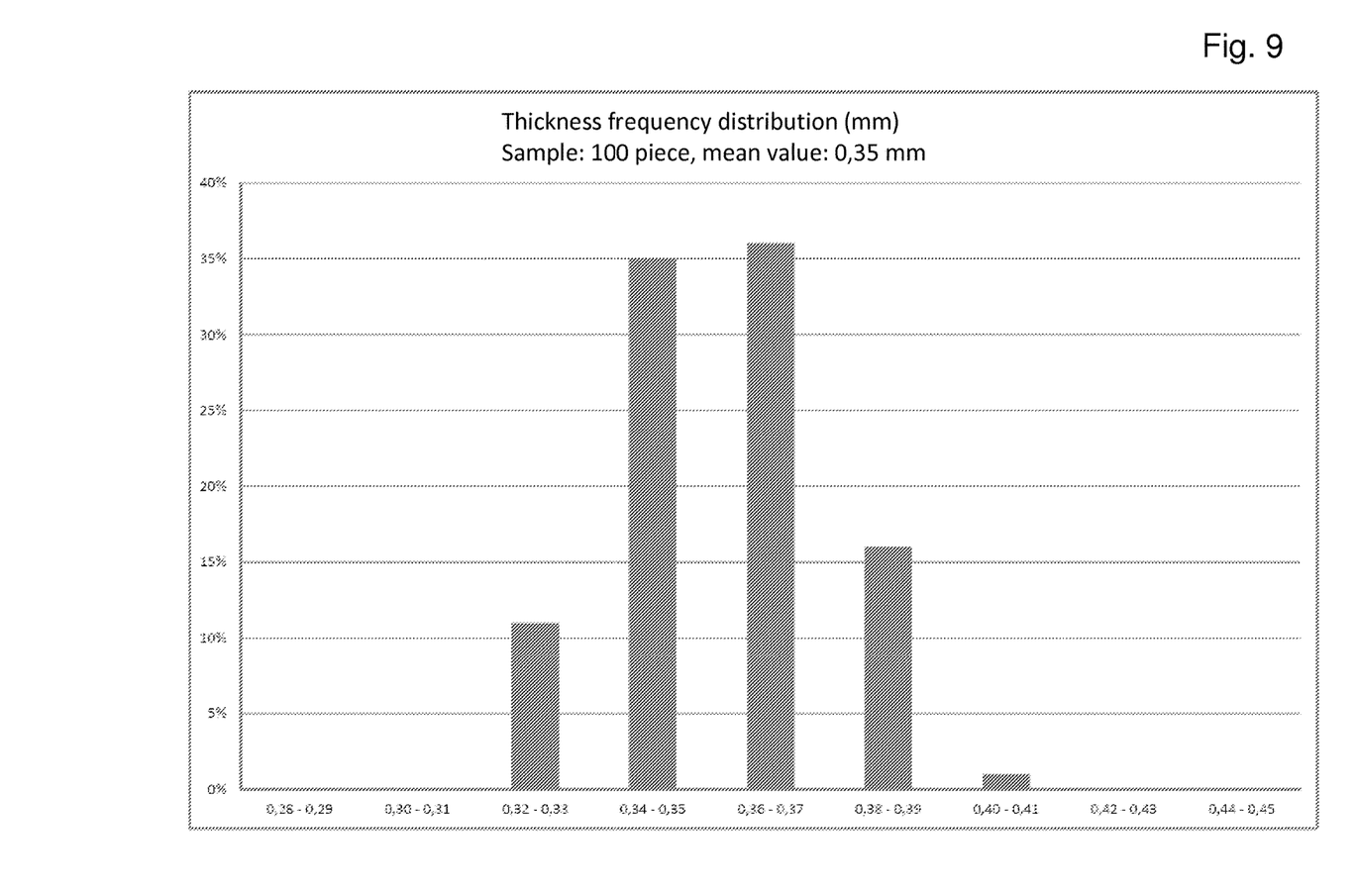
FIG. 9 is an histogram that shows a frequency distribution of a material thickness obtainable by the method and the apparatus of the invention.

The histogram of FIG. 9 shows the results of a test performed on a sample of 100 pieces on which the compression and the crushing of a portion to a nominal value of 0.35 mm has been made, the sheet material having a starting thickness of 1.2 mm. It is observed that more than 70% of pieces have, at the crushed portion, a thickness comprised between 0.34 mm and 0.37 mm and mostly all pieces have a thickness comprised between 0.32 mm and 0.39 mm. The histogram shows the stability and repeatability of the compression and crushing process of the portion of sheet material.

Owing to the apparatus and to the forming method of the invention it is thus possible to make, by thermoforming of a sheet material, in particular single or multilayered polymer plastics, objects having great mechanical features of resistance and toughness that are at the same time provided with one or more weakened, easily perforable, tearable, breakable portions. In other words, it is possible to make objects that are traditionally obtainable only by injection moulding processes, this enabling production costs to be reduced significantly.

A weakened portion is obtained by local compression, made by a suitably shaped punch (crushing punch) and a simultaneous cooling process. By virtue of the pressure exerted by the punch and of the particular circular shape and surface finishing of the end wall thereof, it is possible, at the weakened portion, not only to reduce the thickness of the material but also to obtain a substantially radial or dial orientation of the fibres or chains of molecules that make up the structure of the plastics. The reduced thickness and the radial orientation weaken the structure of the material, which can be more easily perforated or torn, for example by a tip.

Further, by rapidly cooling the weakened portion, in particular in the case of polypropylene, a structure is obtained that is substantially in an amorphous phase with limited portions in a crystalline phase, i.e. a structure that gives the plastics elasticity and resistance. Owing to this structure it is possible to make a perforation without having an undesired detachment of particles, fragments, splinters of material.

The forming apparatus and method of the invention further enable objects provided with weakened portions having precise and accurate thickness values to be made. In particular, it is possible to obtain a desired thickness requested in said weakened portions with high precision and accuracy.

It should be eventually noted that the forming apparatus of the invention is constructionally simple because it requires only the crushing punch 5 to be inserted that can be fixed directly to the containing element 10.

Figure 10:
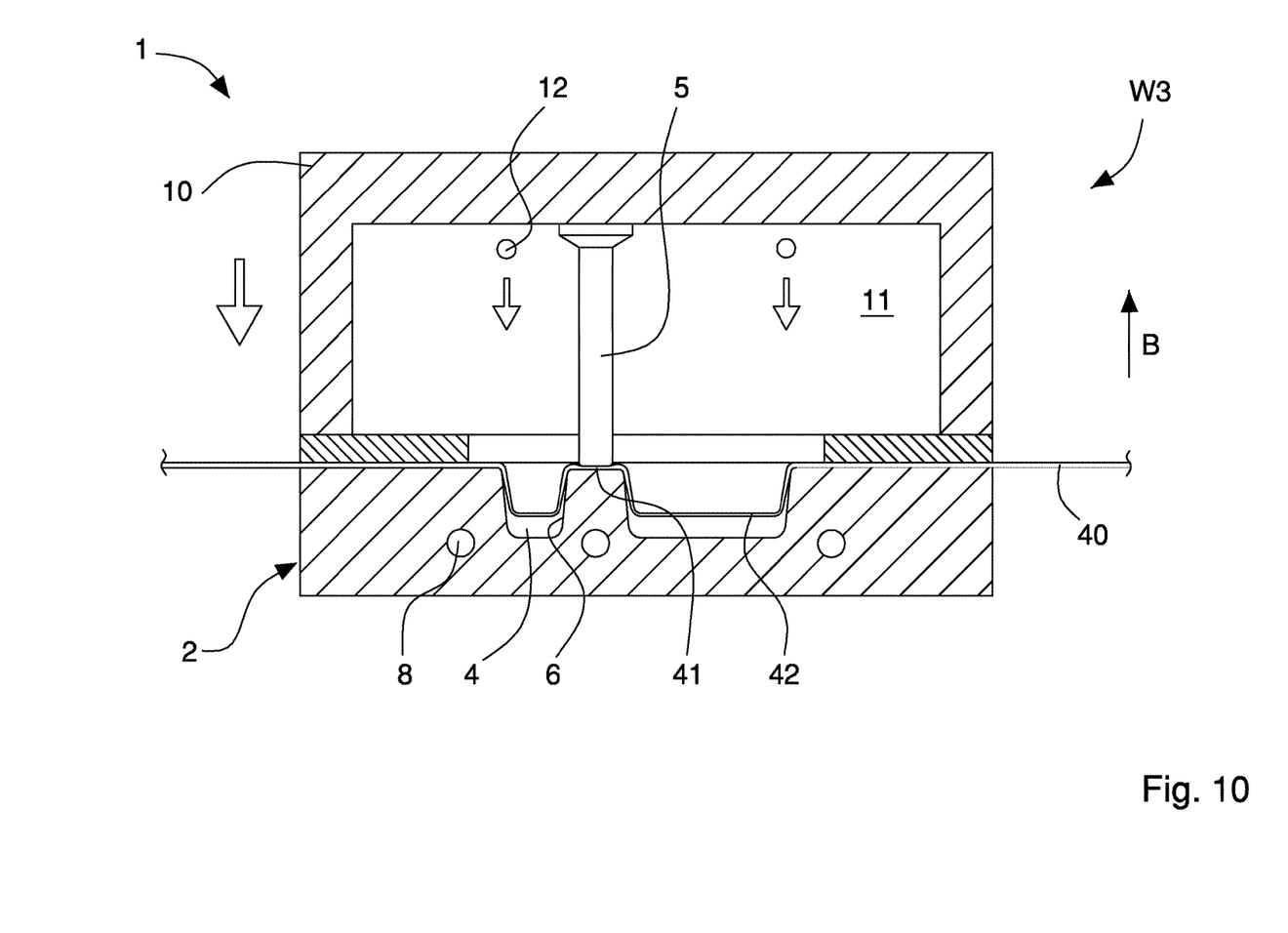
FIG. 10 is a schematic cross section of a variant of the forming apparatus according to the invention in a third operating configuration.

FIG. 10 shows a variant of the forming apparatus of the invention that differs from the embodiment described above and illustrated in FIGS. 1-4, in that the forming assembly does not include a punch portion but rather includes the delivering device 12 that introduces a pressurized fluid such as hot air into the work volume 11 so that the sheet material 40 adheres to the walls of the cavity 4 and thus forms the object 50.

Also in this embodiment of the apparatus 1, during the third step (forming step), in which the forming apparatus is in the third operating configuration W3, while the pressurized fluid is being introduced into the work volume 11, the crushing punch 5 keeps the first portion 41 compressed and crushed against the abutting portion 6.

Figure 5:
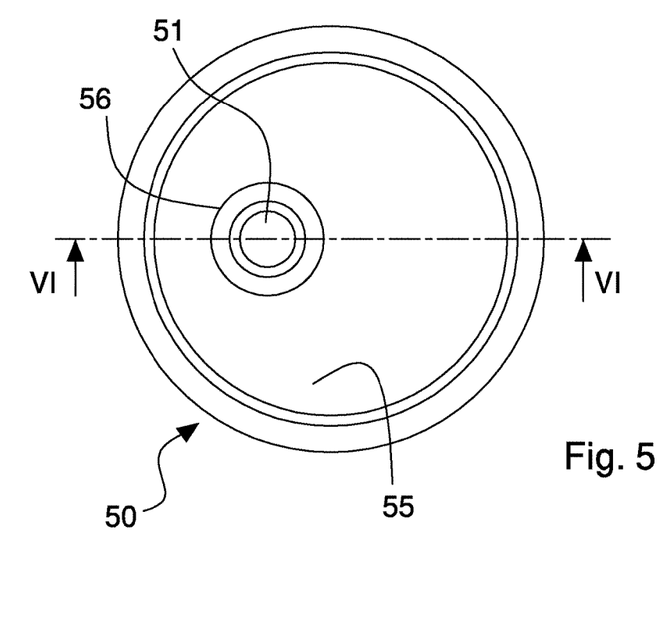
FIG. 5 is a plan view of an object, in particular a cover, made with the forming apparatus in FIG. 1.
Figure 6:
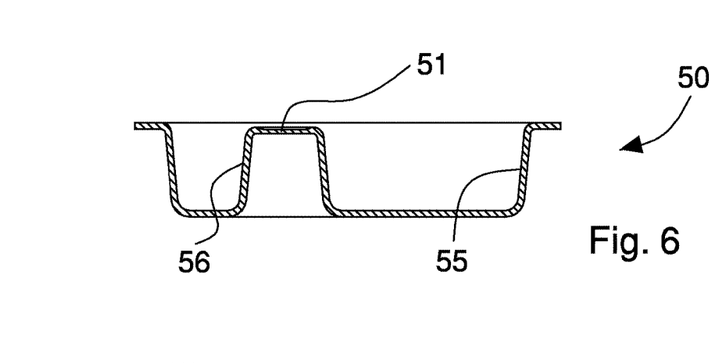
FIG. 6 is a cross section according to the line VI-VI in FIG. 5.

FIGS. 5 to 7 illustrate schematically, and by way of non-limiting example, an object 50 that is makable with the forming apparatus and method according to the invention that are disclosed above. The object comprises a cover or cap 50 that is usable for closing a container 60. The latter is, for example, a capsule for automatic beverage machines that is suitable for containing a percolable or soluble or infusion product.

The cover 50 includes one annular cavity 55 that defines an eccentric protrusion 56 on the summit of which a weakened portion 51 is provided that is formed by the first portion 41 of sheet material 40 compressed by the crushing punch 5. This weakened portion 51 of the cover 50, by virtue of the localized features of the themoformable plastic can be easily perforated by a suitable dispensing device of an automatic beverage machine.

The container 60 can also be made by the forming apparatus of the invention provided in this case with a die and with punches that are suitably shaped in such a manner as to make on a bottom wall 62 of the container a respective weakened portion 61 that can be easily perforated by a suitable extraction device of an automatic machine and/or by cooperation of the bottom wall 62 of the container 60 with a suitable device for opening the capsule. In addition, the respective weakened portion 61 of the container 60 is made by compressing and crushing a corresponding portion of sheet material by means of a suitable crushing punch.

It is obvious that the forming apparatus and method of the invention can be used to form a thermoformable sheet material so as to make objects of any shape and provided with one or more weakened portions that are arranged to be easily perforated, pricked or torn.

The invention claimed is:

1. A method for making objects by forming a thermoformable sheet material, comprising the steps of forming said objects by interaction of a die assembly and a forming assembly, wherein said method further comprises before said forming step, compressing and crushing a first portion of said sheet material by a crushing punch portion maintained at a temperature of between 15° C. and 40° C. in order to locally cool said first portion so that it is in a substantially amorphous phase and maintaining said first portion crushed during said forming step to reduce a thickness thereof and to orient chains of molecules that compose a structure of said sheet material at said first portion so as to weaken said structure and said first portion, whereby said first portion is perforable, tearable and breakable.

2. A method according to claim 1, wherein said orienting step comprises radially orienting said chains of molecules that compose the structure of said sheet material at said first portion.

3. A method according to claim 1, wherein said sheet material is selected from a single or multilayered polymeric plastic material, comprising at east one of PP, PVC, PE, PET, PA, PS, PLA, biodegradable plastic starch based materials, biobased polymeric materials including PE and/or PP and/or PA obtained from renewable sources, and biodegradable plastic materials from microbial source.

4. A method according to claim 1, wherein said forming step comprises forming a second portion of said sheet material contiguous to said first portion.

5. A method according to claim 1, and further comprising heating said sheet material at a temperature between 140° C. and 165° C. before said forming step.

* * * * *